United States Patent
Chung (10) Patent No.: US 7,272,892 B2
(45) Date of Patent: Sep. 25, 2007

(54) DEVICE AND METHOD FOR ARRANGING A FLAT PANEL DISPLAY

(75) Inventor: Chul Chung, Pleasanton, CA (US)

(73) Assignee: Mondo Systems, Inc., Seoul (KR)

( * ) Notice: Subject to any disclaimer, the term of this patent is extended or adjusted under 35 U.S.C. 154(b) by 0 days.

(21) Appl. No.: 11/210,105

(22) Filed: Aug. 24, 2005

(65) Prior Publication Data

US 2006/0143932 A1 Jul. 6, 2006

(51) Int. Cl.
*G01D 21/00* (2006.01)
*A47F 5/08* (2006.01)

(52) U.S. Cl. .......................... 33/333; 33/645; 248/544

(58) Field of Classification Search ................ 33/333, 33/379, 562, 563, 613, 645; 248/125.1, 125.3, 248/544
See application file for complete search history.

(56) References Cited

U.S. PATENT DOCUMENTS

| | | | |
|---|---|---|---|
| 1,612,455 A * | 12/1926 | McGeorge | 33/562 |
| 1,936,529 A * | 11/1933 | Taylor | 248/125.3 |
| 2,524,168 A * | 10/1950 | Harnish, Jr. et al. | 33/613 |
| 2,949,798 A * | 8/1960 | Berta, Jr. | 33/563 |
| 4,139,287 A | 2/1979 | Wessinger | |
| 4,228,982 A | 10/1980 | Sellera | |
| 4,750,832 A | 6/1988 | Lloyd, Sr. et al. | |
| 5,209,449 A | 5/1993 | Hart | |
| 5,303,895 A * | 4/1994 | Hart | 248/544 |
| 5,348,274 A * | 9/1994 | Breen | 33/613 |
| 5,454,542 A | 10/1995 | Hart | |
| 6,073,892 A | 6/2000 | Dittmer | |
| 6,310,726 B1 | 10/2001 | Iizuka | |
| 6,416,027 B1 | 7/2002 | Hart | |
| 6,421,928 B1 * | 7/2002 | Miller | 33/613 |
| 6,480,104 B1 | 11/2002 | Wall et al. | |
| 6,520,646 B2 | 2/2003 | Rodriguez, Jr. et al. | |
| 6,520,647 B2 | 2/2003 | Raskar | |
| 6,637,711 B2 | 10/2003 | Enochs | |
| 6,719,260 B1 | 4/2004 | Hart | |
| 6,877,863 B2 | 4/2005 | Wood et al. | |
| 6,952,887 B2 * | 10/2005 | Muchnik | 33/645 |
| 6,963,348 B2 | 11/2005 | Diamond et al. | |
| D517,085 S * | 3/2006 | Deuschle | D14/451 |
| 2002/0066199 A1 | 6/2002 | Hanson | |
| 2004/0114115 A1 | 6/2004 | Runco | |
| 2004/0252283 A1 | 12/2004 | Ogawa | |

(Continued)

FOREIGN PATENT DOCUMENTS

GB 2 333 693 8/1999

OTHER PUBLICATIONS

Search Report dated Dec. 21, 2006.

*Primary Examiner*—G. Bradley Bennett
(74) *Attorney, Agent, or Firm*—H.C. Park & Associates, PLC (57) ABSTRACT

A device and method for arranging a display allows for the easy installation of a display in a home entertainment system. The flexibility of modern home entertainment/theater systems that include a digital display device permits many different installation options. Thus, the invention facilitates the installation of such a display by aligning a viewing screen with a projector device. Moreover, the invention allows the installation of a flat panel display, such as an LCD or PDP, at a proper viewing angle.

12 Claims, 5 Drawing Sheets

U.S. PATENT DOCUMENTS

| | | |
|---|---|---|
| 2005/0078282 A1 | 4/2005 | Tamura |
| 2005/0110911 A1 | 5/2005 | Childrey et al. |
| 2005/0122483 A1 | 6/2005 | Yamasaki et al. |
| 2005/0157270 A1 | 7/2005 | Muraoka et al. |
| 2005/0168705 A1 | 8/2005 | Li et al. |
| 2005/0205725 A1* | 9/2005 | Yokouchi et al. ........ 248/125.1 |
| 2005/0210695 A1 | 9/2005 | Muday et al. |
| 2005/0231691 A1 | 10/2005 | Li |
| 2005/0236530 A1* | 10/2005 | Weatherly et al. ....... 248/122.1 |
| 2005/0258321 A1* | 11/2005 | Worrall et al. .............. 248/201 |

* cited by examiner

DEVICE AND METHOD FOR ARRANGING A FLAT PANEL DISPLAY

BACKGROUND OF THE INVENTION

1. Field of the Invention

The invention relates to installing a flat panel display device. It also relates to aligning a component or components along a preferred plane to provide an optimal viewing experience.

2. Description of Related Art

Until fairly recently, a consumer only had the choice of using a typical cathode-ray tube television or an analog big screen projection television for use as a display in a home entertainment or home theater system. The advent of the many digital displays, which include flat panel displays like plasma display devices (PDPs) and liquid crystal displays (LCDs), as well as digital projection technologies, like digital light processing (DLP™), now provide may options for the home user.

Normally, these new digital displays are much lighter and take up less space than their similarly sized analog predecessors. Accordingly, they can be installed in many different ways. For example, flat panel displays can be hung directly on a wall, while a DLP™ projector can be paired with a movie screen and be used like a slide projector or mounted from the ceiling. These installations ensure that the room where the home entertainment system is located is not cluttered with bulky equipment. On the other hand, these arrangements can be difficult to install and an a mistake by an unskilled installer or a do-it-yourselfer may result in a display that is slightly askew, i.e. not installed at a proper viewing angle.

Thus, there is a need for making the installation easier to ensure a proper installation of these digital displays. That way, the user who has invested considerable time and money in acquiring and/or setting up a home entertainment or home theater system does not get stuck with a "crooked" display. Alternatively, there is a demand for providing a way of compensating for any mistakes in installing a digital display, so that the home entertainment system user may still enjoy a high-end multimedia experience.

SUMMARY OF THE INVENTION

Accordingly, the invention may address these problems by facilitating the installation of a display at a proper angle. The invention can also facilitate the display of video at a proper alignment angle even if the installation of the display is improper. The invention may be suitable for the integrated multimedia system like the one described in U.S. patent application Ser. No. 11/198,356 filed Aug. 8, 2005, which is hereby incorporated by reference in its entirety.

The invention provides an adjustable bracket for mounting a display device that includes a faceplate having an interface corresponding to a mounting position on a display device; a plurality of holes adapted to receive a fastener disposed on the face plate; and a level device disposed on the face plate. The level device indicates that an edge of the faceplate is substantially level.

The invention also provides a removable display device installation apparatus, which includes a floor stand surface that supports the installation stand on a supporting surface; and a display support surface coupled to the floor stand surface that supports a display device above the supporting surface. The display support surface is substantially parallel to the floor stand surface. The display support surface of the installation stand aligns a bottom surface of the display device on a plane substantially parallel to the supporting surface.

Also, a method of mounting a display device is disclosed. The method includes placing an installation apparatus on a supporting surface to align the supporting apparatus on a plane substantially parallel to the supporting surface; providing a bracket structure adapted to receive the display device coupled with the installation apparatus; and mounting the display device onto the bracket to secure the display device to a mounting surface substantially perpendicular to the supporting surface. An edge of the display device is substantially parallel to the supporting surface.

Moreover, the invention discloses a display device installation apparatus that includes a bracket adapted to receive a display device and a floor stand coupled to the bracket. The floor stand is substantially parallel to the bracket Additional features and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed. For example, while the invention was developed to solve certain problems related to installing digital displays, it may be used in other applications and with other devices where aligning components is desirable.

BRIEF DESCRIPTION OF THE DRAWINGS

The accompanying drawings, which are included to provide a further understanding of the invention, are incorporated in and constitute a part of this specification, illustrate embodiments of the invention, and together with the detailed description serve to explain principles of the invention. No attempt is made to show structural details of the to invention in more detail than may be necessary for a fundamental understanding of the invention and the various ways in which it may be practiced.

DETAILED DESCRIPTION OF THE INVENTION

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figures 1, 2, 3:
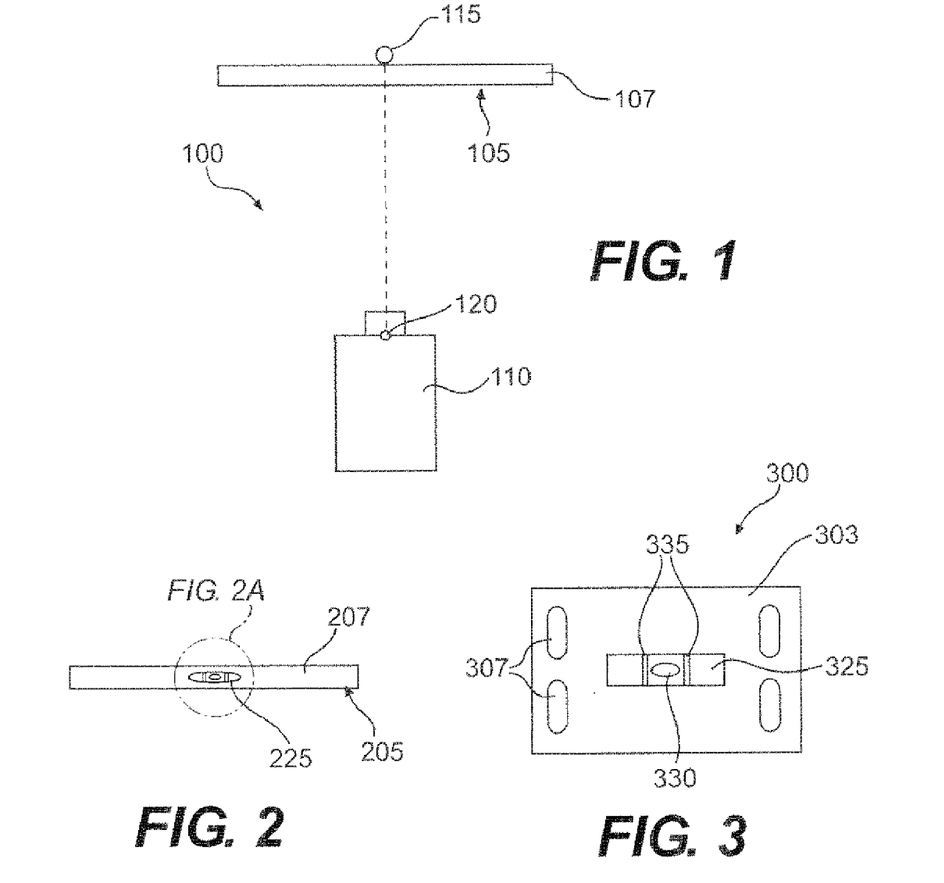
FIG. 1 illustrates a plan view illustrating the alignment of a projector and a viewing screen according to an embodiment of the invention.
FIG. 2 illustrates a plan view of a leveling device included in a viewing screen.
FIG. 3 illustrates a front elevational view of a leveling device included in a mounting bracket according to another embodiment of the invention.

As shown in FIG. 1, an alignment system 100 includes a viewing screen 105 and a display device 110. Here, a typical viewing screen that is well-known to those having ordinary skill in the art is used for screen 105, and a DLP™ projector mounted on a ceiling is used as display device 110.

The screen 105 includes an emitter 115, which can be a laser, a radio transmitter, or other emission device. The emitter 115 may be located on a housing 107 of the screen 105 that comprises a motor (not shown) for raising and lowering the screen. The power supply could be a small battery or be a power source that drives the motor if the screen is motorized to draw up and down. The display device 110 may include a receptor 120 that receives the emission, also known as a medium, be it light, laser, or a radio signal, from emitter 115. However, the display device 110 can be manually located using the signal coming from the emitter.

After receiving the emission, receptor 120 delivers it to an alignment processor (not shown) that can determine if the display device 110 is properly aligned with the screen 105. After processing the received emission, the invention can then provide feedback whether the screen 105 and display device 110 are aligned. Such feedback can be provided by sound, visually through an indicator light or a display screen located on the display device 110, or other feedback mechanism known to those skilled in the art. Using such an alignment system 100, it may be easily determined whether display device 110 is properly aligned with viewing screen 105.

The location of emitter and the receptor can be switched so that emitter 115 is included with display device 110 and the receptor 120 is included with screen 105. In such a case, the screen could be manually located using the signal coming from the emitter of the display device 110. The feedback mechanism could be easily provided on the housing 107 of screen 105. Such a variation in the arrangement of alignment system 100 would not change the principles of operation thereof and such a modification would be understood by those persons having skill in the art.

Figure 2A:
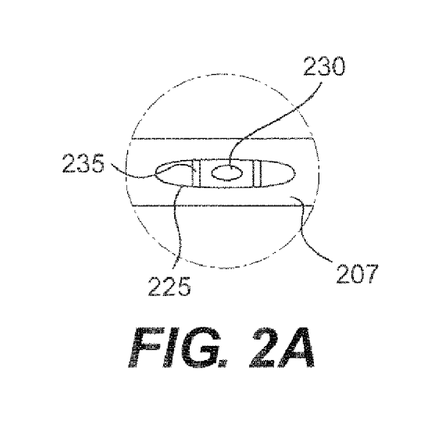
FIG. 2A illustrates a close-up view of the area "A" of FIG. 2.

Looking at FIG. 2 and FIG. 2A, the invention also discloses a device that facilitates the level installation of a viewing screen 205, which includes a level device 225.

Here, the screen 205 includes a housing 207, which may or may not be motorized, on which the level device 225 is disposed. The level device 225 may comprise an indicator 230 and a pair of level lines 235. The level device may operate like a typical level, wherein the level device indicates levelness by the location of the indicator 230 in relation to the level lines 235. Generally, a level position is indicated when the indicator 230 is about centered between the level lines. Any other types of level devices, including but not limited to, laser level, could also be used.

Accordingly, when hanging a screen with level device 225, an installer will know the screen is level because of the indication of levelness provided by the level device.

Figure 4:
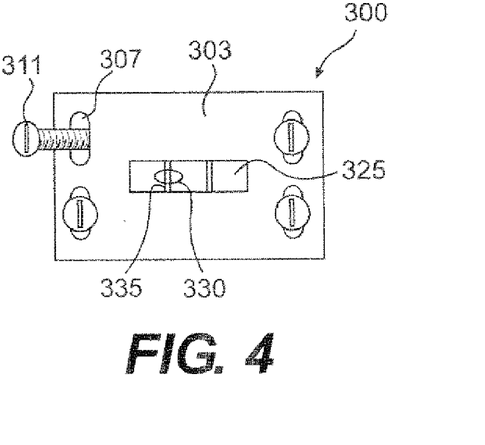
FIG. 4 illustrates a front elevational front view showing an operation of the mounting bracket from FIG. 3.

FIG. 3 and FIG. 4 show a similar approach to provide a level position indication when hanging a flat panel display on a wall.

A mounting bracket 300 is provided that includes a level device 325. The bracket 300 has an interface (not shown) that is coupled with a flat panel display (not shown) at a predetermined mounting position thereon, which is suitable for adequately supporting the flat display device on a wall, for example. One or more brackets may be used depending on a number of factors, like the size of the display or the desired bracket size. Like the embodiment illustrated in FIG. 2A, the level device 325 includes an indicator 330 and level lines 335 that operate to indicate a level position similar to the level device 225. Also, any types of level devices, including but not limited to a laser level, could be used.

The bracket 300 also includes mounting holes 307 that are adapted to receive a fastener 311, like a screw, to fasten the bracket faceplate 303 securely against a wall or other supporting surface to support the weight of a flat panel display.

Here, the width of hole 307 is narrower than the head of fastener 311 and substantially the same width as the fastener body, but the height of hole 307 is elongated. The fastener 311 can be used with other structures, like a washer or a bolt, as well as other structures that are well-known in the fastening art, to assist the securing of the bracket. This arrangement allows the fastener 311 to securely fasten bracket 300 when the head of the fastener 311 is in contact with faceplate 303 to secure the bracket against the wall. This arrangement also allows the position of bracket 300 to be adjusted when the fastener 311 is loosened. Any other mechanisms that could make a small adjustment, including but not limited to, a bracket, a latch, or a hinge could be used.

As shown in FIG. 4, the level device shows a non-level position. Because the mounting position on the display is designed to fit the bracket, then if the bracket 300 is level then the mounted display should also be substantially level.

Thus, an installer may loosen a fastener 311 to adjust the bracket into a level position. One or more fasteners 311 may be loosened to allow the installer to adjust the faceplate 303 until the indicator 330 is between level lines 335 to indicate a level position. Subsequently, the installer may tighten the fasteners 311 to secure bracket 300 in a level position.

Accordingly, by providing a level position indicator with an adjustment mechanism, an installation of a flat display panel in a level position is facilitated. Once the bracket is installed level, the flat panel display could be attached to the bracket, using the attachment mechanism between the flat panel display and the bracket.

Figure 5:
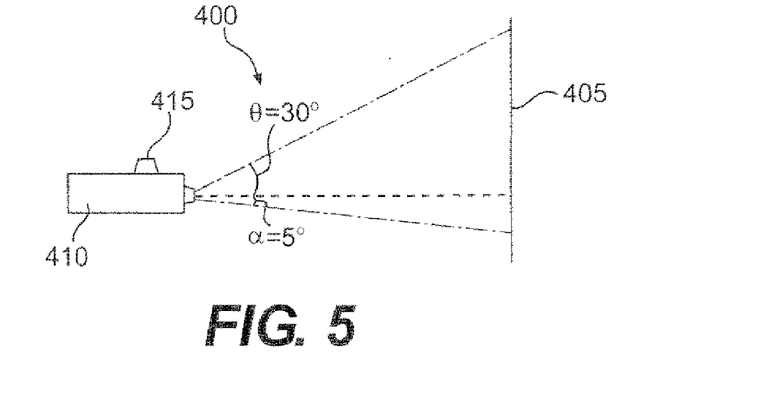
FIG. 5 illustrates a side elevational view showing an image correction system according to an embodiment of the invention.

FIG. 5 illustrates a system for providing an adjustment for a display projector, wherein the adjustment aligns the projected display onto a viewing screen similar to the one illustrated in FIG. 1. Here, the adjustment system 400 comprises a screen 405 and a display projector 410, which comprises an image capture device 415.

The image capture device 415 is mounted on the projector, which may be mounted from the ceiling or placed on a table top or located in a console. The angle of projection shown here is from the table top/console position. The angle of projection is inverted when projector is mounted from the ceiling. The dotted line illustrates the optical center of the projection lens of projector 410. Here, projector 410 has a primary projection angle θ of 30 degrees in relation to the lens is shown, as wells as a secondary angle α of 5 degrees. These angles may vary and are used only for illustrative purposes.

The image capture device 415, which is a camera here, captures the screen image and provides this image to an adjustment processor (not shown). The adjustment processor may process the screen image, as well as the actual image projected by projector 410, and provide a signal adjustment to a lens shifter that will center the image in relation to the screen 405 both along a vertical axis (floor-to-ceiling) and a horizontal axis (wall-to-wall). The image capture device 415 and adjustment processor can be either an integral part of the projector 410 or added later.

Figure 5A:
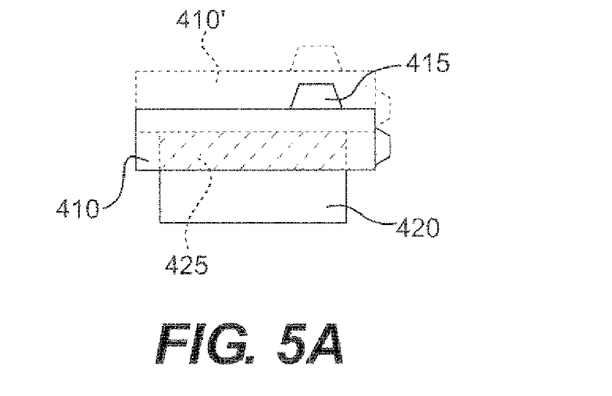
FIG. 5A illustrates a side elevational view of a vertical adjustment of a projector according to an embodiment of the invention.
Figure 5B:
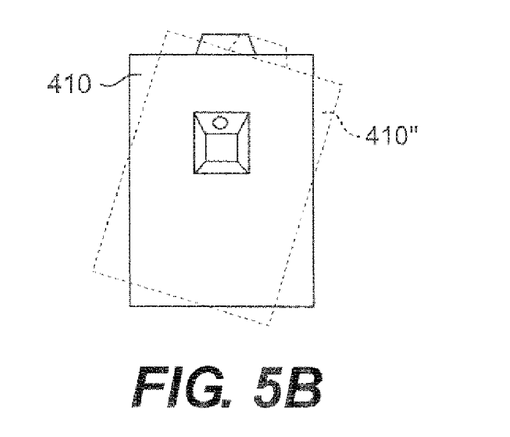
FIG. 5B illustrates a plan view of a horizontal adjustment of the projector according to an embodiment of the invention.
Figure 5C:
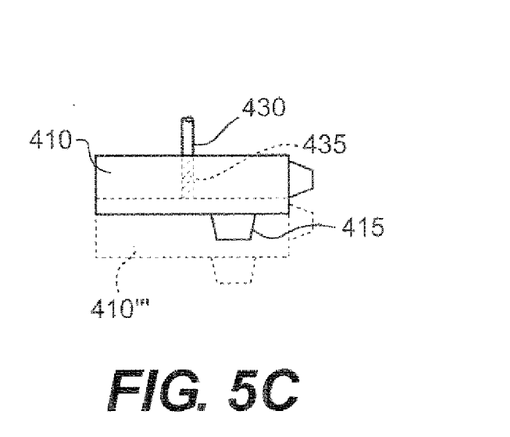
FIG. 5C illustrates a side elevational view of a vertical adjustment of a projector according to another embodiment of the invention.

Looking at FIGS. 5A, 5B, and 5C, a separate device may also be provided in lieu of a lens shifter that moves the entire projector 410 so that the projected image is centered on screen 405. For example a pod 420 on a table top/console could raise and lower the projector 410 using a projecting portion 425 to provide an adjustment along the vertical axis, and the pod could rotate or tilt (not shown) the projector 410 to provide an adjustment along the horizontal axis. FIG. 5A shows the projector 410 adjusted to a raised position 410' (outlined by a broken line) to make a vertical adjustment. In addition, FIG. 5B shows the projector adjusted to as rotated position 410" (outlined by a broken line) to make a horizontal adjustment.

For a projector 410 mounted from the ceiling, a telescopic post 430 could raise and lower the projector 410 using a telescopic portion 435 to provide the vertical axis adjustment, and the telescopic post could rotate the projector 410 to provide the horizontal axis adjustment. FIG. 5C shows the projector 410 adjusted to a lowered position 410''' (outlined by a broken line) to make a vertical adjustment.

Moreover, as would be known to those of skill in the art, a combination of these elements could be used wherein, for example, the pod/post 420 or 430 is used for vertical axis adjustment and a lens shifter is used for horizontal axis adjustment. Also, user input such as a remote control device, for example, could be used to manually adjust the projected image to fit the screen.

Accordingly, using adjustment system 400 facilitates the orientation of a projected display on a viewing screen 405.

Figure 6:
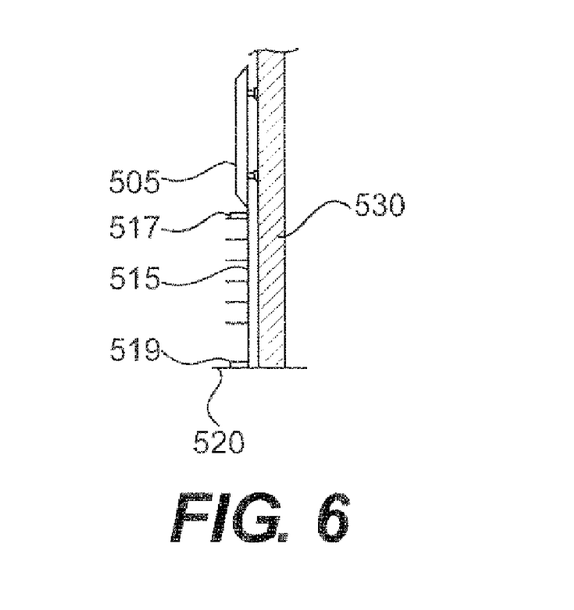
FIG. 6 illustrates a side elevational view of a removable installation apparatus according to an embodiment of the invention.
Figure 6A:
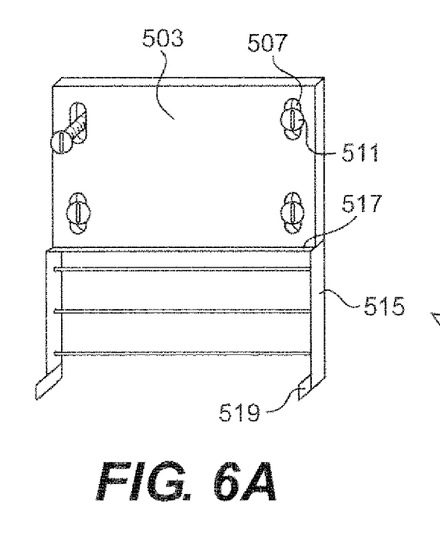
FIGS. 6A, 6B, 6C, and 6D illustrate perspective views of various stages of mounting a flat panel display against a wall using the removable installation apparatus of FIG. 6.
Figure 6B:
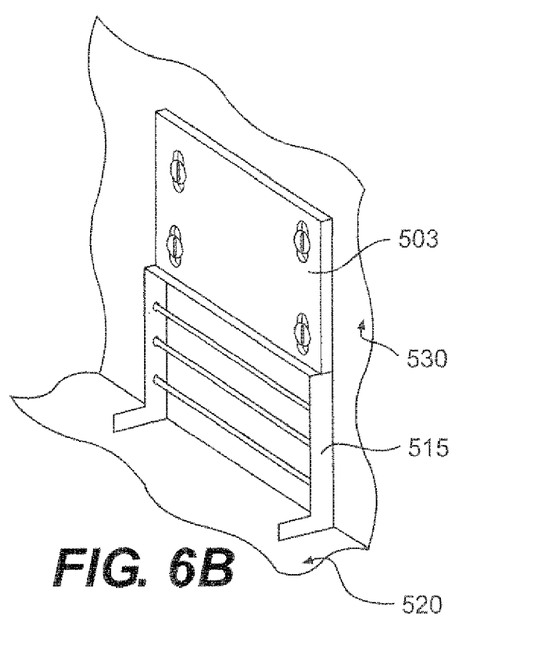
Figure 6C:
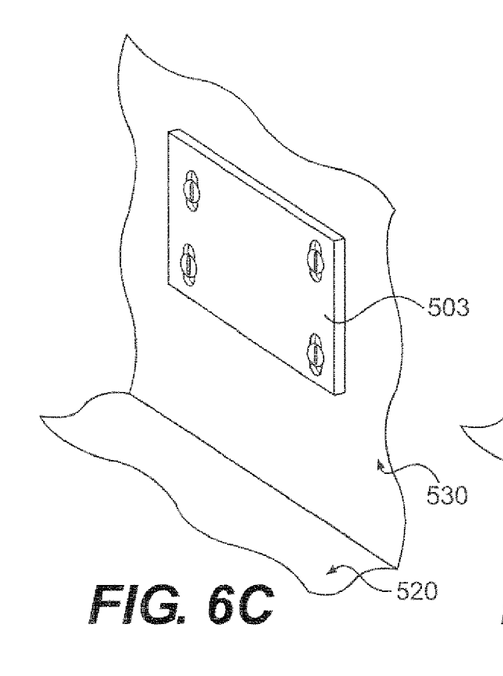
Figure 6D:
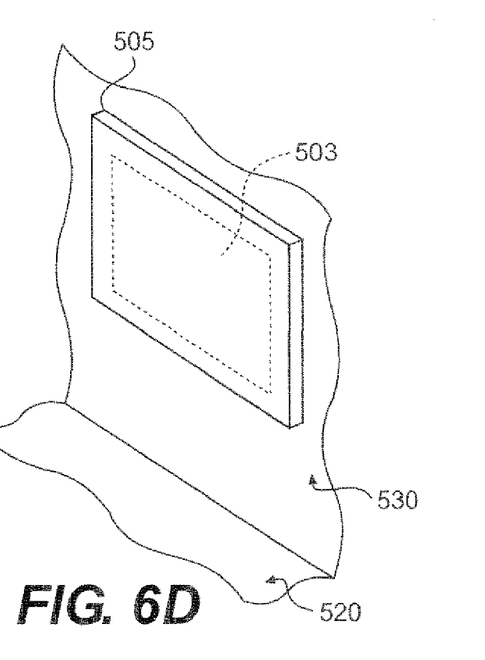
Figure 7:
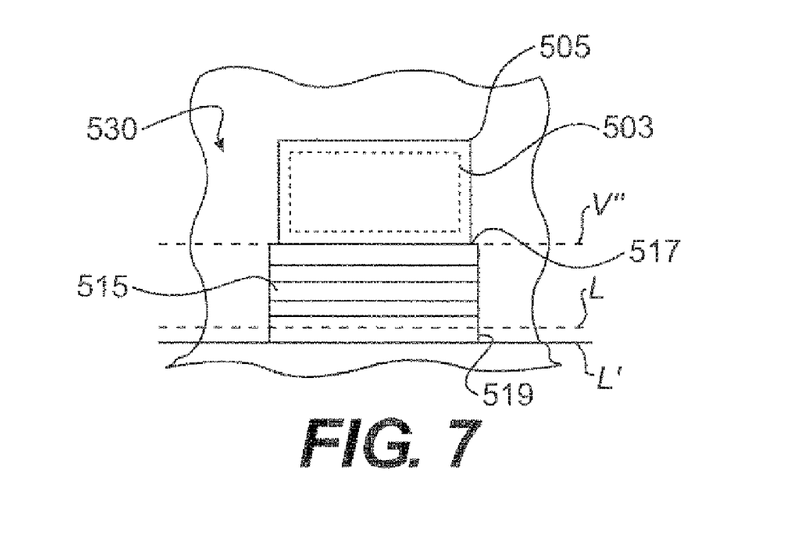
FIG. 7 illustrates a front elevational view of the removable installation apparatus of FIG. 6 and a plane associated therewith.

FIG. 6 and FIG. 7 illustrate a removable installation apparatus 515 for installing a viewing screen or a flat panel display 505 at the same angle as the floor. FIG. 6A through FIG. 6D illustrate mounting a flat panel display using the removable installation apparatus.

Often floors are not level. Thus, if the display is truly "level," it will not be level to the user's viewing angle because the viewer is standing or sitting on furniture resting on the non-level supporting surface like a floor. The installation device 515 addresses this by providing a reference to the floor angle during installation.

The removable installation apparatus 515 comprises a display supporting surface 517 and a floor stand 519, which are parallel to one another. The floor stand 519 rests on floor 520 to align the display supporting surface 517 on the same angle as the floor 520. Then the display 505 or bracket 503 can rest on the display supporting surface 517 during installation of display 505 onto a mounting surface like a wall 530 using bracket 503. The bracket 503 may include a similar arrangement as the bracket illustrated in FIG. 3 to permit an adjustment of the display's 505 mounting position.

FIG. 6A shows bracket 503 resting on display supporting surface 517 of installation apparatus 515, while bracket 503 is secured to the wall 530 using fasteners 511 inserted through bracket holes 507. The display supporting surface 517 has a very narrow depth so that the installation apparatus 515 does extend too far from the wall 530. FIG. 6B shows the bracket 503 secured in place, wherein a bottom surface of the bracket 503 is arranged on a plane substantially parallel to the plane of the display supporting surface 517, the portion of floor stand 519 resting on floor 520, and the floor itself. In an integrated structure, the brackets are fixed to the wall in parallel with the floor surface, once the integrated structure stands again the wall. Then, the lower part can be removed except for the bracket. The lower part may also be left place and used for shelving and other purposes. FIG. 60 shows that the removable installation apparatus 515 can be removed because the bracket 503 is secured to wall 530 by fasteners 511. FIG. 6D shows the display device 505 mounted on the bracket 503 using a pre-set mounting position of the display 505 adapted for the bracket 503. The bottom edge of the display 505 is substantially parallel to the bottom edge of the bracket 505, and thus is substantially parallel to the floor 520.

Alternatively, the bracket 503 can be coupled to the installation apparatus 515, or formed integrally therewith, to form a unitary bracket/installation apparatus. In this arrangement, the display supporting surface 517 can be eliminated but the reference angle to floor 520 is still provided because the bracket is coupled to the floor stand 519 resting on the floor. As a result, the bracket portion is disposed at an angle substantially the same as the angle of the floor, which orients the display device at the angle of the floor as well.

As can be seen in FIG. 7, the level plane is designated at a plane L. But display supporting surface 517 or display bracket 503 is disposed on a plane L" that is at the same angle as the plane L' of floor 520 and floor stand 519. The bottom of display 505 will also be disposed along L" when it is supported on the installation stand 515 or attached to the bracket 503. After the display 505 is mounted on wall 530, the installation apparatus 515 can either be removed or left in place as furniture to hold other multimedia components, home decor, or the like. The apparatus 515 is no longer needed to support the display 505 since it is mounted on the wall 530 with brackets 503. Because the display supporting surface 517 or the bracket 503 is on the same angle as the floor 520, the display will be oriented at the same angle as the user's viewing angle.

Figures 8, 8A:
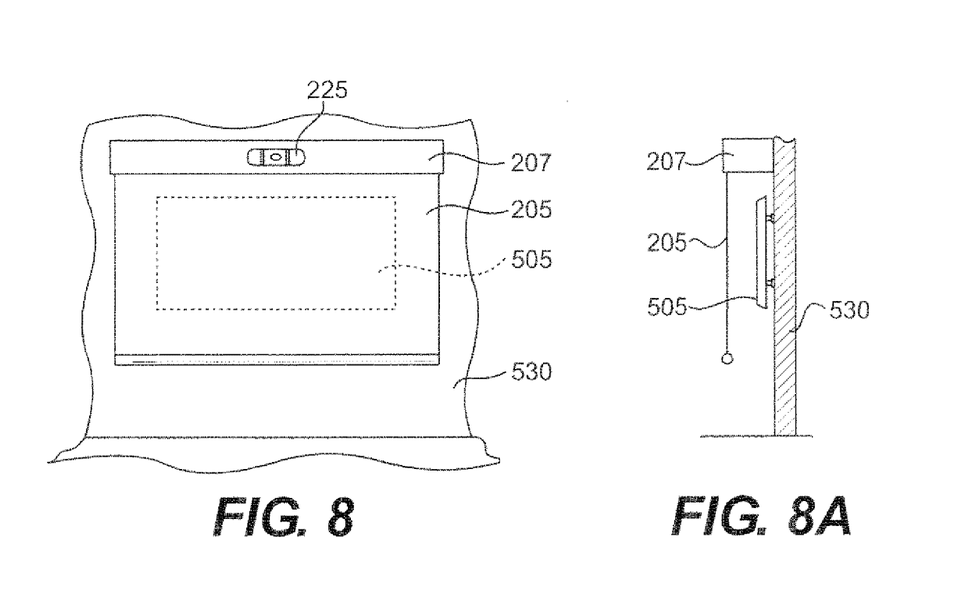
FIG. 8 illustrates a front elevational view of a flat panel display disposed behind a lowered viewing screen according to an embodiment of the invention.
FIG. 8A illustrates a side elevational view of the flat panel display and lowered viewing screen of FIG. 8.
Figures 9, 9A:
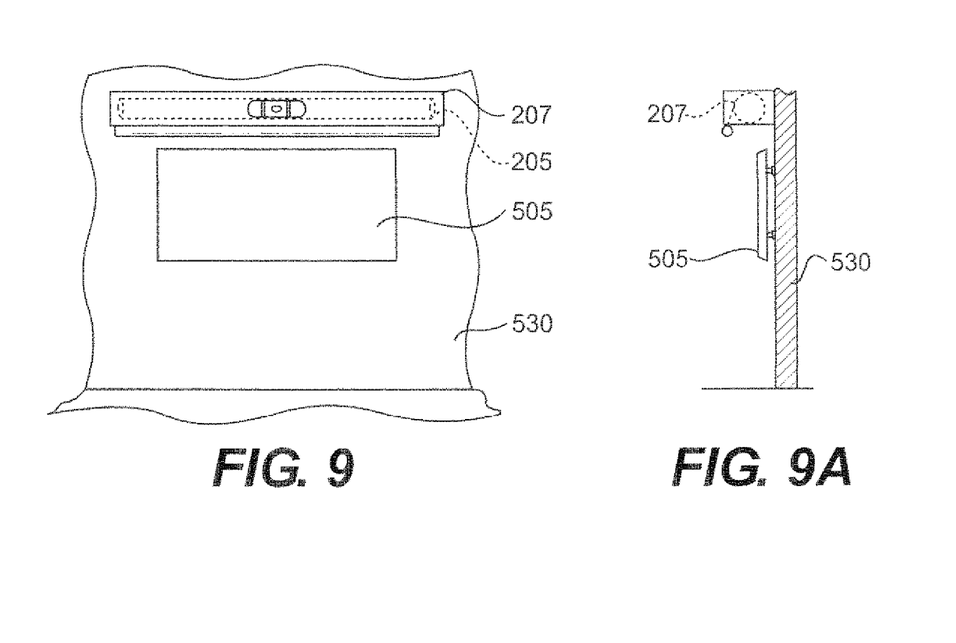
FIG. 9 illustrates a front elevational view of a flat panel display and raised viewing screen disposed in a housing according to an embodiment of the invention.
FIG. 9A illustrates a side elevational view of the flat panel display and raised viewing screen of FIG. 9.

FIG. 8 and FIG. 8A show a lowered viewing screen 205 used with a flat panel display 505, while FIG. 9 and FIG. 9A illustrate a raised viewing screen 205 disposed in motorized housing 207 used with a flat panel display 505. The viewing screen 205 may have a level device 225 as illustrated in FIG. 2.

A user may want to use different types of displays depending on the video source and the viewing conditions. For example, a viewer may want to use the viewing screen 205 at night or for movies, while the user may want to use the flat panel display 505 during the day or for television programs. FIG. 8 shows that the flat panel display 505 (outlined by the broken line) can sit behind the viewing screen 205 when a projection display device is used, FIG. 8A shows a clearance between the viewing screen 205 and flat panel display 505. FIG. 9 and FIG. 9A, show the screen 205 can be easily raised when the user wishes to view the flat panel display 505.

As noted above the installation apparatus 515 requires a narrow depth so as to not extend too far from the wall 530. This may be necessary so that it will not interfere with screen 205 if the removable installation apparatus 515 is not removed after installation of the flat panel display 505.

While the present invention has been described in detail above with reference to specific embodiments, those skilled in the art will appreciate that various modifications and substitutions can be made thereto without departing from the spirit and scope of the present invention as defined in the appended claims.

What is claimed is:

1. A removable display device installation apparatus, comprising:
    a floor stand surface that supports the installation apparatus on a supporting surface; and
    a display support surface coupled to the floor stand surface that supports a bracket above the supporting surface,
    wherein the display support surface is substantially parallel to the floor stand surface, and
    wherein the display support surface aligns a bottom surface of the bracket on a plane substantially parallel to the supporting surface.

2. The removable installation apparatus of claim 1, wherein the removable installation apparatus is removed from supporting the bracket or display device after installation.

3. A method of mounting a display device on a wall, comprising:
    placing an installation apparatus on a supporting surface to align the installation apparatus on a plane substantially parallel to the supporting surface;
    providing a bracket structure adapted to receive the display device coupled with the installation apparatus; and
    mounting the display device onto the bracket to secure the display device to the wall, the wall being substantially perpendicular to the supporting surface,
    wherein an edge of the display device is substantially parallel to the supporting surface.

4. The method of claim 3, wherein the installation apparatus and the bracket structure are separate elements that are removably couplable to each other.

5. The method of claim 3, wherein the installation apparatus is connected to the bracket structure.

6. The method of claim 5, wherein the installation apparatus and the bracket structure are formed integrally as a unitary structure.

7. A method of mounting a display device, comprising:
    placing an installation apparatus on a supporting surface to align the installation apparatus on a plane substantially parallel to the supporting surface;
    providing a bracket structure adapted to receive the display device coupled with the installation apparatus;
    mounting the display device onto the bracket to secure the display device to a mounting surface substantially perpendicular to the supporting surface; and
    removing the installation apparatus so that it does not support the bracket structure or the display device,
    wherein an edge of the display device is substantially parallel to the supporting surface,
    wherein the installation apparatus and the bracket structure are separate elements that are removably couplable to each other, and
    wherein the display device is mounted securely to the mounting surface so that the installation apparatus is not needed to support the display device above the supporting surface.

8. A display device installation apparatus for mounting a display device on a wall, comprising:
    a bracket adapted to receive a display device and adapted to be mounted on a wall; and
    a floor stand coupled to the bracket,
    wherein the floor stand is substantially parallel to the bracket.

9. The apparatus of claim 8, wherein:
    a display device is mounted onto the bracket to secure the display device to the wall, the wall being substantially perpendicular to a supporting surface of the floor stand, and
    an edge of the display device is substantially parallel to the supporting surface.

10. The apparatus of claim 8, wherein the floor stand and the bracket are separate elements that are removably couplable to each other.

11. The apparatus of claim 8, wherein the floor stand and the bracket are formed integrally as a unitary structure.

12. A display device installation apparatus, comprising:
    a bracket adapted to receive a display device; and
    a floor stand coupled to the bracket,
    wherein the floor stand is substantially parallel to the bracket,
    wherein the floor stand and the bracket are separate elements that are removably couplable to each other,
    wherein the floor stand is removed so that it does not support the bracket, and
    wherein the display device is mounted securely to the mounting surface so that floor stand is not needed to support the display device above the supporting surface.

* * * * *